(12) United States Patent
Takahashi (10) Patent No.: US 11,717,884 B2
(45) Date of Patent: Aug. 8, 2023

(54) MOLTEN METAL PUMP, AND METHOD OF ADJUSTING PUMPING POWER OF MOLTEN METAL PUMP

(71) Applicant: Kenzo Takahashi, Shiroi (JP)

(72) Inventor: Kenzo Takahashi, Shiroi (JP)

( * ) Notice: Subject to any disclaimer, the term of this patent is extended or adjusted under 35 U.S.C. 154(b) by 379 days.

(21) Appl. No.: 17/025,297

(22) Filed: Sep. 18, 2020

(65) Prior Publication Data

US 2021/0001397 A1    Jan. 7, 2021

Related U.S. Application Data (63) Continuation of application No. PCT/JP2019/011263, filed on Mar. 18, 2019.

(30) Foreign Application Priority Data

Mar. 20, 2018   (JP) .................................. 2018-053321

(51) Int. Cl.
  *B22D 17/30*   (2006.01)
  *B22D 35/00*   (2006.01)
  *H02K 44/06*   (2006.01)

(52) U.S. Cl.
  CPC ............. *B22D 17/30* (2013.01); *B22D 35/00* (2013.01); *H02K 44/06* (2013.01)

(58) Field of Classification Search
  CPC ......... B22D 17/30; B22D 35/00; H02K 44/06
  See application file for complete search history.

(56) References Cited

U.S. PATENT DOCUMENTS

| | | |
|---|---|---|
| 2010/0244338 A1 | 9/2010 | Takahashi |
| 2011/0197709 A1 | 8/2011 | Koriyama et al. |
| 2011/0278231 A1 | 11/2011 | Nishijima et al. |
| (Continued) | | |

FOREIGN PATENT DOCUMENTS

| | | |
|---|---|---|
| JP | 2010-169381 A | 8/2010 |
| JP | 2011-017521 A | 1/2011 |
| (Continued) | | |

OTHER PUBLICATIONS

Extended European Search Report dated Jun. 21, 2021 in European Patent Application No. 19770585.8, 10 pages.

(Continued)

*Primary Examiner* — Scott R Kastler
(74) *Attorney, Agent, or Firm* — Oblon, McClelland, Maier & Neustadt, L.L.P.

(57) ABSTRACT

In a molten metal pump, which includes a pump chamber portion and a drive unit and drives molten metal in a pump chamber of the pump chamber portion by the drive unit for discharging and sucking, the pump chamber portion has an outer cylinder and an inner cylinder detachably housed in the outer cylinder, the outer cylinder is configured as a bottomed cylindrical body having an outer cylinder bottom wall and an outer cylinder side wall, the inner cylinder is configured as a bottomed cylindrical body having an inner cylinder bottom wall and an inner cylinder side wall, a ring-shaped spacer, which is interposed between an inner surface of the outer cylinder bottom wall and an outer surface of the inner cylinder bottom wall in a sealed state and in a detachable manner, is further provided.

13 Claims, 7 Drawing Sheets

(56) References Cited

U.S. PATENT DOCUMENTS

| | | | |
|---|---|---|---|
| 2014/0252698 A1* | 9/2014 | Rauch | F27D 21/0014 |
| | | | 266/233 |
| 2015/0283605 A1 | 10/2015 | Takahashi | |
| 2017/0176107 A1 | 6/2017 | Takahashi | |
| 2021/0001397 A1* | 1/2021 | Takahashi | F27D 27/005 |

FOREIGN PATENT DOCUMENTS

| | | | |
|---|---|---|---|
| JP | 2011-139611 A | | 7/2011 |
| JP | 2011139611 A | * | 7/2011 |
| JP | 5496647 B2 | | 5/2014 |
| JP | 2014-213333 A | | 11/2014 |
| JP | 2015-190661 A | | 11/2015 |
| WO | WO 2010/084945 A1 | | 7/2010 |

OTHER PUBLICATIONS

International Search Report dated May 21, 2019 in PCT/JP2019/011263 filed on Mar. 18, 2019, 2 pages.

Japanese Office Action dated Oct. 25, 2019 in Japanese patent application 2019-531189 (with English Machine Translation), 4 pages.

* cited by examiner

MOLTEN METAL PUMP, AND METHOD OF ADJUSTING PUMPING POWER OF MOLTEN METAL PUMP

TECHNICAL FIELD

The present invention relates to a molten metal pump, and a method of adjusting the pumping power of a molten metal pump.

BACKGROUND ART

The following various methods have been used, for example, for discharging molten metal from a melting furnace that melts a non-ferrous metal such as aluminum (e.g., a non-ferrous metal such as Al, Cu, Zn, an alloy containing at least two thereof, or a conductor (electric conductor) such as a Mg alloy) or a conductive metal other than a non-ferrous metal, or from a holding furnace that holds molten metal of a conductive metal. That is, a plug made of iron called a tap is plugged in or out to discharge molten metal from a melting furnace or a holding furnace. Moreover, a carbon blade pump that uses carbon blades is used, and molten metal is pumped out of a melting furnace or a holding furnace by the pump. Furthermore, a pipe made of a refractory body is used, an electromagnetic coil is wound around the pipe, and the molten metal is pumped out of the melting furnace or the holding furnace by electromagnetic force.

However, the above-mentioned various methods respectively have various drawbacks. That is, in the tap plugging in/out method, the worker must directly perform manual work, and this work is extremely dangerous work. Moreover, the carbon blade pump method has various drawbacks because the carbon blades come into direct contact with the molten metal. That is, it is unavoidable that the carbon blades, the shaft, or the like, which are components of the carbon blade pump, are greatly damaged during operation, and an extremely large amount of maintenance cost is required. Furthermore, in the electromagnetic coil method, it is necessary to cool the electromagnetic coil with water. However, in the case of water cooling, it is necessary to manage the water quality, which leads to large power consumption.

In view of such points, the present inventor has previously proposed a non-ferrous molten metal pump (JP 5496647) (Patent Document 1) (hereinafter referred to as a prior invention).

The prior invention is recognized by those skilled in the art other than the present inventor as one completed invention that solves former problems. That is, those skilled in the art other than the present inventor have not felt or have not pointed out that the prior invention has particularly great drawbacks or problems. Therefore, it is impossible for those skilled in the art other than the present inventor to have an incentive to improve the prior invention.

However, the present inventor, who is both an engineer that invented the prior invention and is the patentee of the prior invention, has repeatedly performed experiments, tests, or the like day and night in order to further enhance the usefulness of a device of the prior invention, that is, in order to improve the performance of the device so as to further increase the value in the market and further increase the demand in the market. Since the present inventor is the inventor and the patentee of the prior invention as described above, such experiments or the like have been performed only by the present inventor, and those skilled in the art other than the present inventor have not recognized that the device of the prior invention has particular deficiency, and have not performed experiments or the like.

Thus, the present inventor has first focused on improving the pumping power (discharge pressure and discharge amount) in order to further improve the usefulness of a device of the prior invention. Furthermore, a focus has been put not only on improving the pumping power, but also on adjusting (increasing or decreasing) the pumping power. As a result, the present inventor has tried to replace permanent magnets 32A and 32B in a rotary magnet 14 with permanent magnets having a stronger or weaker magnetic force, in order to increase or decrease the pumping power in a device of the prior invention. It is expected that those skilled in the art other than the present inventor can reach this point.

However, in practice, it has been found that it is actually exceedingly difficult to replace the permanent magnets 32A and 32B with other magnets having a different magnetic force in a device of the prior invention. That is, the work of replacing the permanent magnets 32A and 32B with other permanent magnets in a device of the prior invention is exceedingly complicated, time-consuming, and costly due to the structure of the device of the prior invention, and also, preparing a plurality of other permanent magnets having different strengths in addition to the permanent magnets 32A and 32B as described significantly increases the cost and further causes a problem of storage location. In particular, a permanent magnet that is stronger than permanent magnets 32A and 32B in use is more expensive and more difficult to handle, and makes replacement work more difficult.

As described above, it has been found that replacement of the permanent magnets or the like in a device of the prior invention is actually impossible in site regardless of the magnitude of the magnetic force thereof. This is what the present inventor actually has tried and found, and is difficult for those skilled in the art other than the present inventor to understand. However, it cannot be said that this can never be understood by those skilled in the art other than the present inventor. Furthermore, those skilled in the art will also intuitively feel that it would be structurally impossible to make the pumping power adjustable (discharge pressure and discharge amount) by other means in a device of the prior invention. However, it will be also intuitively felt that a device of the prior invention, once installed, has no means for adjusting the pumping power (discharge pressure and discharge amount) other than replacing the permanent magnets 32A and 32B.

The above description may be similarly understood by those skilled in the art other than the present inventor.

CITATION LIST

Patent Literature

Patent Literature 1: JP 5496647

SUMMARY OF INVENTION

Technical Problem

As described above, the present inventor have understood that the permanent magnets 32A and 32B must be replaced with other magnets in order to improve or adjust the pumping power in a device of the prior invention once installed but replacement is hardly achieved, and has intuitively felt that the improvement or adjustment is actually impossible.

That is, the present inventor has intuitively felt that improvement of a device of the prior invention is actually impossible. It is expected that those skilled in the art other than the present inventor would intuitively feel similarly if they try improvement. Intuitively feeling in this way, the present inventor has once led to a stumbling block to improvement of a device of the prior invention.

However, the present inventor has continued experiments or the like without giving up, for example, for development of a molten metal pump capable of adjusting the pumping power without giving up. That is, the present inventor has continuously conducted experiments or the like in order to obtain a device capable of adjusting the pumping power (discharge pressure and discharge amount) without sticking to a device of the prior invention. As a result, the present inventor has developed a device capable of adjusting the pumping power (discharge pressure and discharge amount) while employing a structure that is not directly related to the structure of a device of the prior invention.

As described above, the present invention has been obtained by continuous experiments or the like performed by the present inventor without direct relation to a device of the prior invention, and an object thereof is to provide a molten metal pump device and a method capable of easily and reliably adjusting the pumping power, which is the original function of the pump device, while keeping the structure simple and easy to maintain.

Solution to Problem

A molten metal pump of the present invention is a molten metal pump, which includes a pump chamber portion and a drive unit and drives molten metal in a pump chamber of the pump chamber portion by the drive unit so as to discharge the molten metal through a pump chamber outlet of the pump chamber portion and suck external molten metal through a pump chamber inlet of the pump chamber portion into the pump chamber, wherein the pump chamber portion has an outer cylinder and an inner cylinder detachably housed in the outer cylinder, the outer cylinder being configured as a bottomed cylindrical body having an outer cylinder bottom wall and an outer cylinder side wall, the inner cylinder being configured as a bottomed cylindrical body having an inner cylinder bottom wall and an inner cylinder side wall, a ring-shaped spacer, which is interposed between an inner surface of the outer cylinder bottom wall and an outer surface of the inner cylinder bottom wall in a sealed state and in a detachable manner, is further provided, the spacer partitioning a space between an inner surface of the outer cylinder bottom wall and an outer surface of the inner cylinder bottom wall to form a pump chamber, the pump chamber communicating with outside through a pump chamber inlet formed at the outer cylinder bottom wall and a pump chamber outlet formed at the outer cylinder side wall, the drive unit has a rotary magnet provided inside the inner cylinder so as to be rotatable about a vertical rotation axis, the rotary magnet having a plurality of permanent magnets arranged on a circumference around the rotation axis, the plurality of permanent magnets each having an upper surface magnetic pole and a lower surface magnetic pole magnetized so that an upper surface part and a lower surface part become magnetic poles, the plurality of permanent magnets are arranged so that upper surface magnetic poles and lower surface magnetic poles having different magnetic poles are alternately aligned along the circumference, the plurality of lower surface magnetic poles of the plurality of permanent magnets vertically facing the inner cylinder bottom wall, and strengths of the plurality of permanent magnets are set so that a line of magnetic force from a first permanent magnet penetrates the inner cylinder bottom wall downward to reach the pump chamber, and penetrates the inner cylinder bottom wall upward from the pump chamber to return to a second permanent magnet adjacent to the first permanent magnet.

A method of adjusting a pumping power of a molten metal pump of the present invention is a method of adjusting a pumping power of a molten metal pump, which includes a pump chamber portion and a drive unit and drives molten metal in a pump chamber of the pump chamber portion by the drive unit so as to discharge the molten metal through a pump chamber outlet of the pump chamber portion and suck external molten metal through a pump chamber inlet of the pump chamber portion into the pump chamber, wherein the pump chamber portion has an outer cylinder and an inner cylinder detachably housed in the outer cylinder, the outer cylinder being configured as a bottomed cylindrical body having an outer cylinder bottom wall and an outer cylinder side wall, the inner cylinder being configured as a bottomed cylindrical body having an inner cylinder bottom wall and an inner cylinder side wall, a ring-shaped spacer, which is interposed between an inner surface of the outer cylinder bottom wall and an outer surface of the inner cylinder bottom wall in a sealed state and in a detachable manner, is further provided, the spacer partitioning a space between an inner surface of the outer cylinder bottom wall and an outer surface of the inner cylinder bottom wall to form a pump chamber, the pump chamber communicating with outside through a pump chamber inlet formed at the outer cylinder bottom wall and a pump chamber outlet formed at the outer cylinder side wall, the drive unit has a rotary magnet provided inside the inner cylinder so as to be rotatable about a vertical rotation axis, the rotary magnet having a plurality of permanent magnets arranged on a circumference around the rotation axis, the plurality of permanent magnets each having an upper surface magnetic pole and a lower surface magnetic pole magnetized so that an upper surface part and a lower surface part become magnetic poles, the plurality of permanent magnets are arranged so that upper surface magnetic poles and lower surface magnetic poles having different magnetic poles are alternately aligned along the circumference, the plurality of lower surface magnetic poles of the plurality of permanent magnets vertically facing the inner cylinder bottom wall, and strengths of the plurality of permanent magnets are set so that a line of magnetic force from a first permanent magnet penetrates the inner cylinder bottom wall downward to reach the pump chamber, and penetrates the inner cylinder bottom wall upward from the pump chamber to return to a second permanent magnet adjacent to the first permanent magnet, the method including a step of replacing the spacer with another spacer having a different height so as to change an interval between the outer cylinder bottom wall and the inner cylinder bottom wall and change a capacity of the pump chamber, thereby adjusting the pumping power.

DESCRIPTION OF EMBODIMENTS

As can be seen from the above description, one of the features of an embodiment of the present invention is that the pumping power (discharge pressure and discharge amount) of a molten metal pump 100 is made adjustable and the usability is improved as described with reference to FIG. 1. In addition, in a device according to an embodiment of the present invention, the pumping power can be adjusted in two modes. That is, a device according to an embodiment of the present invention is configured to have two functions as a function of adjusting the pumping power, that is, a primary adjustment function and a secondary adjustment function as will be described later.

First, in order to realize the primary adjustment function, a device according to an embodiment of the present invention is configured so that the capacity of a pump chamber P can be easily changed regardless of before or after installation in site.

That is, first, according to a device of an embodiment of the present invention, the capacity of the pump chamber P of the molten metal pump 100 is made variable according to the application or according to the characteristics or the like of the molten metal M, regardless of before or after installation of the pump device, so that the pumping power (discharge pressure and discharge amount) can be adjusted (primary adjustment function). This makes the molten metal pump 100 extremely useful. Specifically, as will be described later in detail, the capacity of the pump chamber P can be changed by changing the height of the spacer 11 in FIG. 1.

Furthermore, as a result of employing the configuration for making the capacity of the pump chamber P variable, various effects peculiar to the present invention, which are never obtained by conventional devices, are obtained based on the configuration as will be described later. Regarding a molten metal pump, a technical idea of enabling the capacity of the pump chamber P to be changed in this manner is neither disclosed nor suggested in any prior art including the prior invention. In addition, as described above, the prior invention does not have a particular disadvantage. That is, neither those skilled in the art other than the present inventor nor the present inventor recognizes that the prior invention has a particular problem. For this reason, a device according to an embodiment of the present invention can be said to be a different device that is not directly related to devices of the prior invention and other prior art and has a structure and effects completely different. That is, it cannot be said that those skilled in the art could accomplish the present invention based on the prior invention and other prior art.

Moreover, in order to realize the secondary adjustment function, the magnetic field generator 5 can be moved vertically in a device according to an embodiment of the present invention as will be described later in detail.

As a result, it is possible to change the mode in which lines of magnetic force ML from the magnetic field generator 5 penetrate the molten metal M in the pump chamber P and to make the pumping power adjustable (secondary adjustment function). Moreover, such vertical movement can set the height of the magnetic field generator 5 with respect to the capacity or the like of the pump chamber P so that the magnetic force of the magnetic field generator 5 is most efficiently applied to the molten metal M in the pump chamber P.

As described above, according to a device of an embodiment of the present invention, the primary adjustment function and the secondary adjustment function can be used in two steps, and the pumping power can be adjusted more reliably.

The following description will explain embodiments of the present invention in detail.

Figure 1:
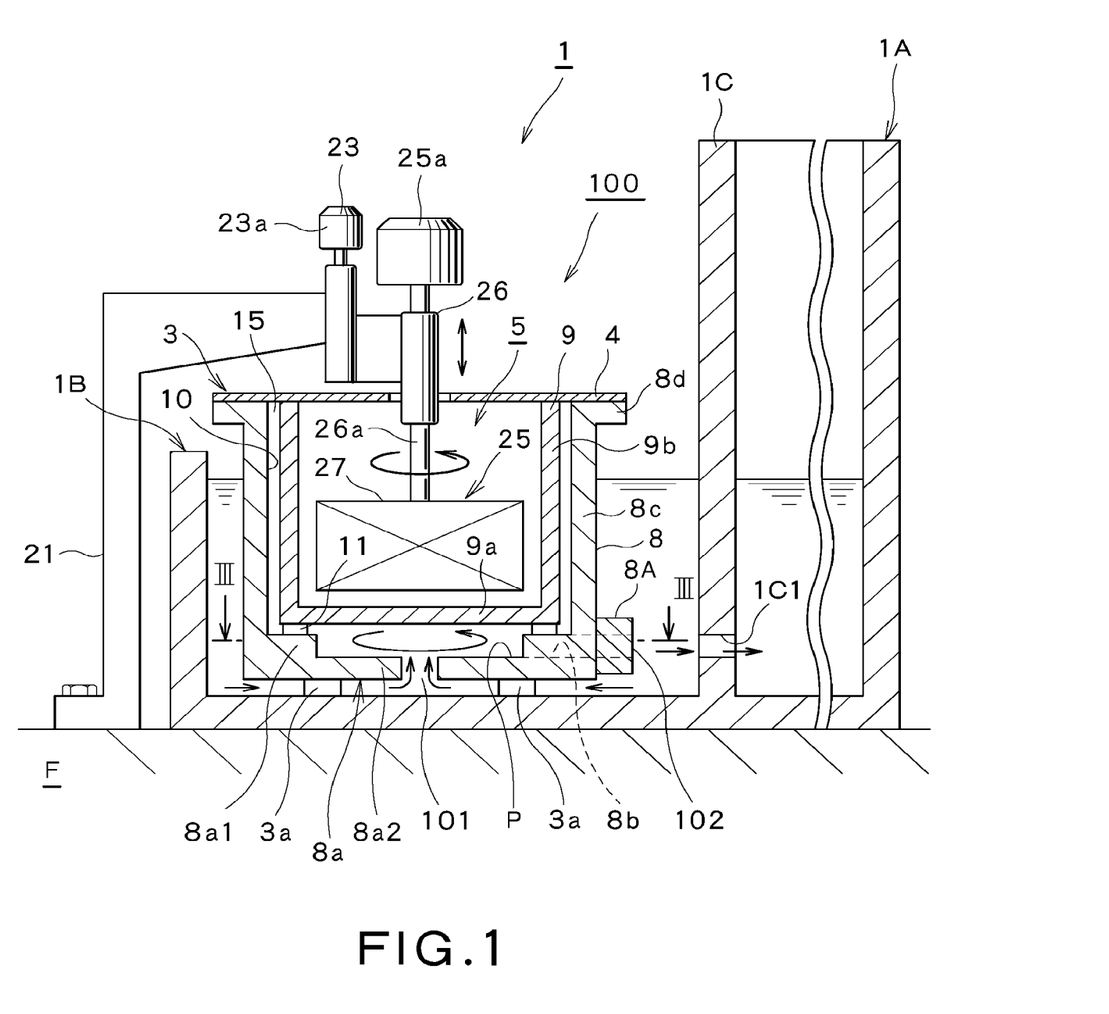
FIG. 1 is a vertical cross-sectional explanatory view of a melting furnace having a molten metal pump according to an embodiment of the present invention.

FIG. 1 is a vertical cross-sectional explanatory view illustrating an entire melting furnace 1 for melting a conductive metal, according to an embodiment of the present invention. The conductive metal is a non-ferrous metal such as aluminum (e.g., a non-ferrous metal such as Al, Cu, Zn, an alloy of at least two thereof, or a conductor (electric conductor) such as an Mg alloy) or a conductive metal other than the non-ferrous metal.

The melting furnace 1 according to an embodiment of the present invention discharges molten metal M from a molten metal pump 100 installed in a stirring bath (pre-furnace) 1B, and causes the molten metal M to flow into the main bath 1A, so that the molten metal M of the conductive metal in the main bath 1A can be stirred.

That is, the melting furnace 1 includes the main bath 1A and the stirring bath 1B as described above. The main bath 1A and the stirring bath 1B are partitioned by a partition wall 1C and communicate with each other through a communication opening 1C1 formed at the partition wall 1C.

The molten metal pump 100 is housed and installed in the stirring bath 1B. The stirring bath 1B can also be manufactured by modifying an existing bath. The molten metal pump 100 is installed on a bottom surface of the stirring bath 1B in a state floated above the bottom surface using legs 3a. In use, the molten metal pump 100 is partially immersed in the molten metal M in the stirring bath 1B as can be seen from FIG. 1. In this state, the molten metal pump 100 sucks the molten metal M in the stirring bath 1B through a molten metal inlet 101 and discharges the molten metal M through a molten metal outlet 102. The discharged molten metal M flows through the communication opening 1C1 of the partition wall 1C into the main bath 1A and agitates the molten metal M in the main bath 1A as described above. It is to be noted that a plurality of legs having different heights may be prepared as the legs 3a. By changing the height to a different one, the suction amount or the like through the molten metal inlet 101 can be adjusted. This can also adjust the molten metal pump 100 to operate optimally.

As described above, the melting furnace 1 of the present invention can be configured by modifying an existing bath to make the main bath 1A and the stirring bath 1B, and installing the molten metal pump 100 in the stirring bath 1B. As a result, a device according to an embodiment of the present invention can be configured by slightly modifying an existing bath.

The molten metal pump 100 includes a pump chamber portion having a pump chamber P or the like, and a drive unit having a magnetic field generator 5 or the like that drives the molten metal M in the pump chamber P to rotate.

As will be seen from the following description, the pump chamber portion includes a container 3, and the container 3 has an outer cylinder 8, an inner cylinder 9, a heat insulator 15, a spacer 11, the legs 3a, a nozzle 8A, a lid 4, and the like, and the drive unit has an arm 21, an elevating mechanism 23, the magnetic field generator 5, and the like.

The molten metal pump 100 in the pump chamber portion has a double-cylindrical container 3 that has an open top and has bottom walls 8a and 9a. The magnetic field generator 5 of the drive unit is housed inside the container 3 in a state hung from above in the outside and in a vertically movable manner.

That is, the height of the magnetic field generator 5 inside the container 3 can be vertically adjusted as will be described later. This makes it possible to change the mode in which the magnetic field from the magnetic field generator 5 is applied to the molten metal in the pump chamber P. As a result, first, the form in which the magnetic field from the magnetic field generator 5 is applied to the molten metal M in the pump chamber P can be directly changed, and the height of the magnetic field generator 5 can be adjusted to a position corresponding to the capacity of the pump chamber P. That is, the height of the magnetic field generator 5 in the container 3 can be adjusted to the most appropriate height for performing the pump operation. That is, it can be said that the magnetic field generator 5 has a pump operation tuning and pumping power adjustment function (secondary adjustment function).

In FIG. 1, denoted at 4 is a lid that covers the container 3. As will be described later, the inner cylinder 9 can be fixed to the outer cylinder 8 only by pressing the lid 4 from above.

The double-cylindrical container 3 in the pump chamber portion has an outer cylinder 8 made of a refractory material, and an inner cylinder 9 also made of a refractory material detachably housed therein. The outer cylinder 8 is configured to have an open top and have the bottom wall (outer cylinder bottom wall) 8a. Furthermore, the nozzle 8A is attached to a lower portion of an outer peripheral surface of the outer cylinder 8. The inside of the outer cylinder 8 and the inside of the nozzle 8A communicate with each other. The outer cylinder 8 and the nozzle 8A can be integrally configured. The inner cylinder 9 is configured to have an open top and have the bottom wall (inner cylinder bottom wall) 9a. According to the height of a spacer 11 to be described later, inner cylinders 9 having a plurality of peripheral wall heights are prepared, and a plurality of the inner cylinders 9 having different heights are prepared for replacement at the time of wear and damage. A gap 10 for heat insulation is provided between the peripheral wall of the outer cylinder 8 and the peripheral wall of the inner cylinder 9. In the gap 10, a sandy heat insulator, a powdery heat insulator, or the like is housed as the heat insulator 15. As the sandy heat insulator, powdery heat insulator, or the like, various general-purpose materials can be employed, and, for example, silica sand, quartz stone, dolomite, feldspar, soda ash, or the like can also be employed. It is to be noted that the gap 10 may be a space without interposing a heat insulator in the gap 10. That is, air may be used as a heat insulating material.

Figure 2:
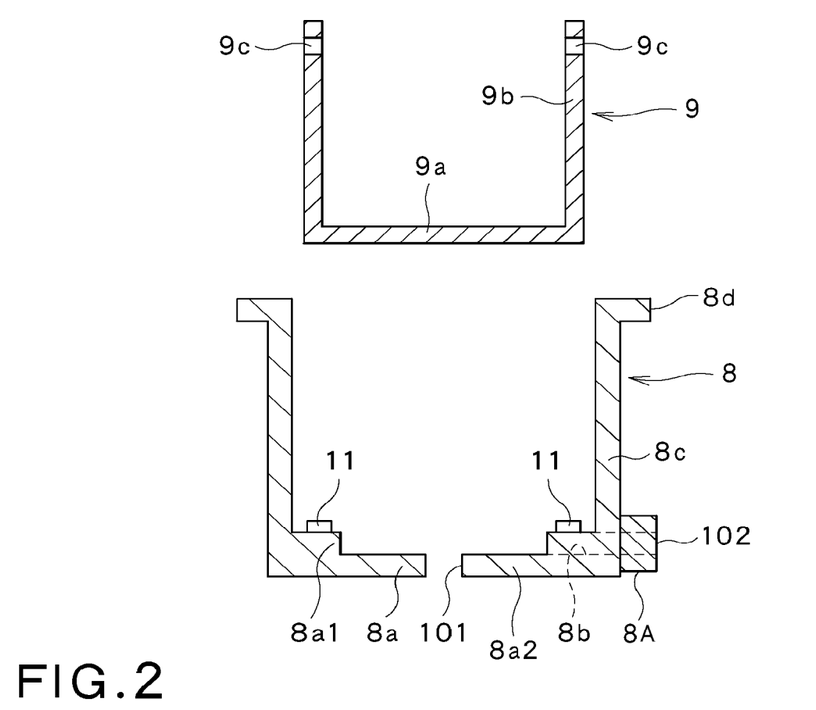
FIG. 2 is an operation explanatory view illustrating a process of attaching and detaching an inner cylinder of the molten metal pump to an outer cylinder in the melting furnace of FIG. 1.

The inner cylinder 9 is detachably housed in the outer cylinder 8 with a bottom surface floated by a fireproof spacer 11 that also functions as a ring-plate-shaped packing. FIG. 2 illustrates an example of a state in which the inner cylinder 9 is attached to and detached from the outer cylinder 8 as will be described later. The bottom wall 9a of the inner cylinder 9, the bottom wall 8a of the outer cylinder 8, and the ring-shaped spacer 11 partition the pump chamber P in a sealed state. The spacer 11 is interposed between the inner surface of the outer cylinder bottom wall 8a and the outer surface of the inner cylinder bottom wall 9a in a sealed state and in a detachable manner.

A plurality of spacers 11 having different heights are prepared, and one having a desired height among them is selectively used according to how much the capacity of the pump chamber P is to be made. An inner cylinder 9 having a height corresponding to the height of the spacer 11 is used. As described above, the capacity of the pump chamber P can be changed by selectively using the spacers 11 having different heights. Such height adjustment can be performed when the molten metal pump 100 is installed, or after the molten metal pump 100 is once installed.

Thus, the pumping power generally has a discharge pressure and a discharge amount. In a device according to an embodiment of the present invention, when the same magnetic field generator 5 is used and the capacity of the pump chamber P is increased, the discharge pressure decreases and the discharge amount can be increased. Moreover, when the capacity of the pump chamber P is decreased, the discharge amount decreases and the discharge pressure can be increased. Accordingly, a plurality of spacers 11 having different heights are prepared, and a spacer 11 having a height corresponding to a required pumping power, physical properties of the molten metal M used (physical properties of the molten metal itself and physical properties of impurities such as ferrous metal contained therein) or the like is determined by experiments or the like and used, so that the discharge pressure and the discharge amount can be adjusted to desired values. As described above, replacement with a spacer having a different height can be performed when the molten metal pump 100 is installed in the stirring bath 1B, or at any time after installation. As a result, the pumping power (discharge pressure and discharge amount) can be adjusted regardless of before or after the installation of the molten metal pump 100.

Figure 3:
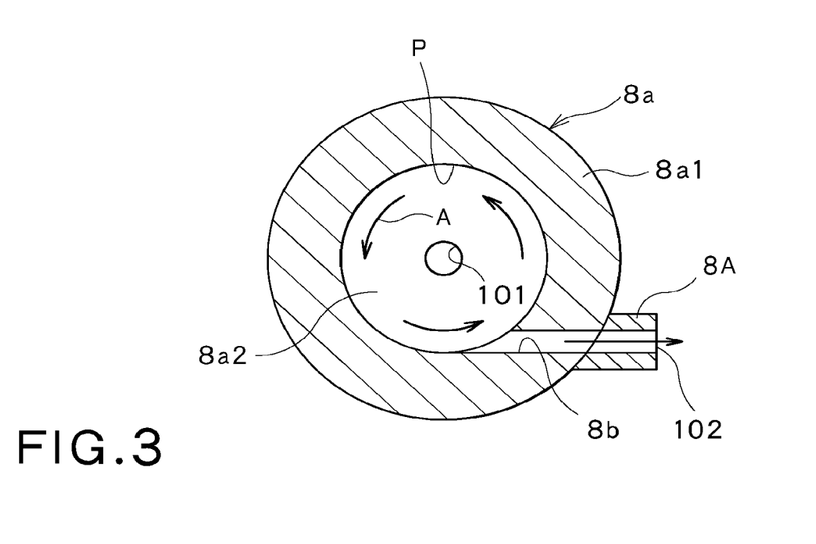
FIG. 3 is an explanatory end view taken along line III-III in FIG. 1.

As can be seen from FIG. 1, the pump chamber P has the molten metal inlet 101 and the molten metal outlet 102. That is, the inside of the pump chamber P communicates with the outside (inside of the stirring bath 1B) through the molten metal inlet 101 formed at the bottom wall 8a of the outer cylinder 8, an outflow guide hole 8b formed at the side wall (outer cylinder side wall) 8c of the outer cylinder 8, and the molten metal outlet 102 provided at the nozzle 8A. Such a communication state is also illustrated in FIG. 3 as a plan view. FIG. 3 is an end view of the outer cylinder 8 and the nozzle 8A taken along line III-III in FIG. 1. It is to be noted that the outflow guide hole 8b can be used as the molten metal outlet without providing the nozzle 8A.

More specifically, as can be seen from FIG. 1, the outer cylinder 8 is configured as a cylindrical body having a flange 8d and the bottom wall 8a and having a closed lower end. As can be seen from FIGS. 1 and 3, a center part of the inner surface of the bottom wall 8a of the outer cylinder 8 is depressed to form a disk-shaped thin part (pump chamber section 8a2) in the central part, and a ring-shaped thick part (inner cylinder support portion 8a1) in the outer peripheral part. The molten metal inlet 101 is formed in the pump chamber section 8a2. Moreover, the outflow guide hole 8b is formed laterally at the inner cylinder support portion 8a1. The outflow guide hole 8b communicates with the molten metal outlet 102 of the nozzle 8A. Therefore, the molten metal M is sucked through the molten metal inlet 101 into the pump chamber P, and is discharged from the molten metal outlet 102 through the outflow guide hole 8b.

Moreover, as described above, the inner cylinder 9 is detachable from the outer cylinder 8 and the heat insulator 15 as can be seen from FIG. 2. That is, FIG. 2 illustrates a state in which the inner cylinder 9 is pulled out from the outer cylinder 8 and the heat insulator 15 (or a state before the inner cylinder 9 is inserted into the outer cylinder 8 and the heat insulator 15). It is to be noted that the inner cylinder 9 is conveyed and moved vertically by various means. For example, in order to lift, grip, and convey the inner cylinder 9 with a crane, a hanging hole 9c through which a hook of the crane is passed is formed near the upper end of the side wall (inner cylinder side wall) 9b of the inner cylinder 9. Actually, it is to be noted that the inner cylinder 9 may be tapered so that the lower portion has a smaller diameter than the upper portion in order to facilitate the pulling out and inserting.

Moreover, according to a device of an embodiment of the present invention in which the inner cylinder 9 is configured to be detachable from the outer cylinder 8 as described above, it is possible to achieve excellent effects that are peculiar to a device according to an embodiment of the present invention as follows and are never obtained by the prior art. That is, when the inner cylinder 9 is pulled up, the inside of the pump chamber P is exposed to the outside as illustrated in FIG. 2. In this state, the so-called pump chamber cleaning can be performed extremely easily. This is an extremely useful advantage in site in a pump device for molten metal. That is, it is unavoidable that molten slag of various impurities (e.g., oxides) contained in the molten metal M adheres to the inner surface of the molten metal inlet 101, the pump chamber P, the outflow guide hole 8b, the molten metal outlet 102, or the like during the pump operation. In particular, the adhesion of the slag is remarkable when the molten metal M contains impurities such as ferrous metal. In a molten pump, such molten slag needs to be regularly cleaned and removed. However, as described above, it is possible with an embodiment of the present invention to expose the inside of the pump chamber P to the outside by removing the inner cylinder 9 and further the upper wall part of the pump chamber P, and therefore cleaning to remove the molten slag adhering to each place can be performed extremely easily and reliably in a short time, the maintenance time of the molten metal pump 100 can be shortened, and the usefulness of the molten metal pump 100 can be further enhanced.

Next, the magnetic field generator 5 having a magnetic field generator body 25 in the drive unit, which is inserted and housed inside the inner cylinder 9, will be described.

As can be seen from FIG. 1, in the melting furnace 1, particularly inside the inner cylinder 9, the magnetic field generator body 25 of the magnetic field generator 5 in the drive unit is housed in a suspended state and with a height arbitrarily adjustable. More specifically, the magnetic field generator 5 includes the substantially L-shaped arm 21 having a leg part fixed to a floor F, the elevating mechanism 23 mounted on a tip part thereof, and the magnetic field generator body 25 vertically moved by the elevating mechanism 23. The elevating mechanism 23 has an electric motor 23a.

Furthermore, in the magnetic field generator body 25, the electric motor 25a rotates a rotary magnet 27 via a shaft mechanism (bearing) 26 and a shaft 26a. It is to be noted that the arm 21 can be fixed to a pedestal of a mobile body (not shown) capable of traveling on the floor F, so that the magnetic field generator 5 can travel.

Figure 4:
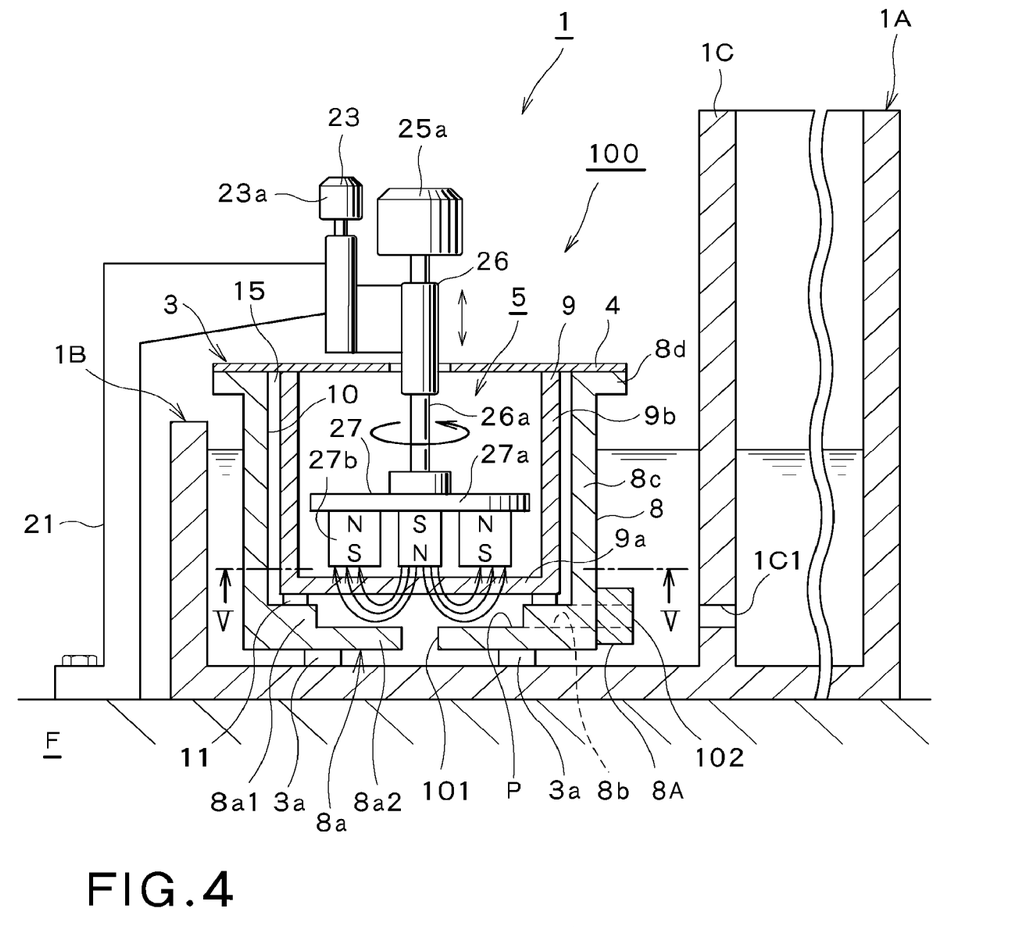
FIG. 4 is a vertical cross-sectional explanatory view of a melting furnace having a molten metal pump, illustrating a specific example of the melting furnace of FIG. 1.
Figure 5:
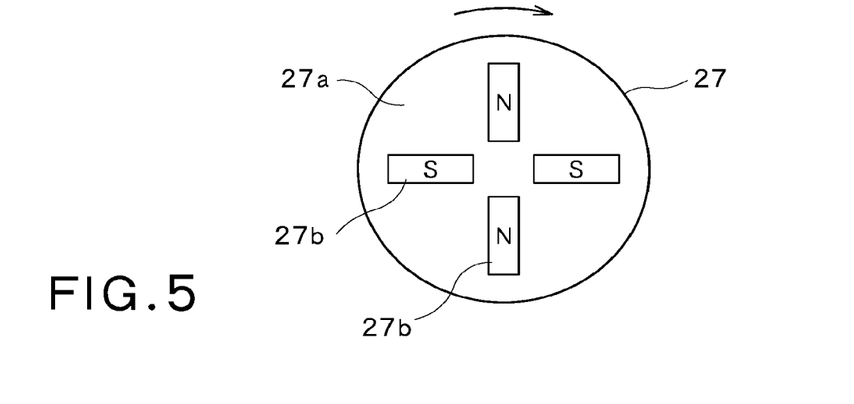
FIG. 5 is an explanatory view of a rotary magnet of FIG. 4 viewed along line V-V.

The rotary magnet 27 can have various configurations. An example thereof is illustrated in FIGS. 4 and 5. As can be seen from FIG. 4, a disk 27a is attached to the shaft 26a.

A plurality of permanent magnets (magnet pieces) 27b are attached to the disk 27a in a hung state. The planar positional relationship is illustrated in FIG. 5. FIG. 5 is an arrow view taken along line V-V in FIG. 4. That is, FIG. 5 is a view of the disk 27a and the magnet pieces 27b viewed from the bottom to the top in FIG. 4. As can be seen from FIG. 5, four permanent magnets 27b are arranged and fixed in a hung state on the lower surface of the disk 27a at predetermined intervals along the circumference, for example, at intervals of 90 degrees.

As can be seen from FIG. 4, each permanent magnet (magnet piece) 27b is magnetized so that both upper and lower surfaces serve as magnetic poles, that is, so as to have upper and lower surface magnetic poles. In addition, as can be seen from FIG. 5, the plurality of magnet pieces 27b are arranged such that N poles and S poles are alternately aligned along the circumferential direction when viewing the lower surface magnetic pole, for example.

Therefore, as will be described later, lines of magnetic force ML that have gone downward from the N pole of a certain magnet piece 27b penetrate the bottom wall 9a of the inner cylinder 9 to reach the pump chamber P, penetrate the molten metal M, then make a U-turn, go upward, penetrate the bottom wall 9a, and reach the S pole of another magnet piece 27b as can be seen from FIG. 4.

When the rotary magnet 27 is rotated in such a state, lines of magnetic force ML move in the conductive molten metal M, an eddy current is generated in the molten metal M, and the molten metal M rotates along arrow A as illustrated in FIG. 3, for example. The rotation speed of the molten metal M at this time corresponds to the rotation speed of the rotary magnet 27. During such rotation, in the pump chamber P, the peripheral part has a high pressure and the center part has a low pressure. As a result, the molten metal M in the stirring bath 1B is sucked through the molten metal inlet 101 into the pump chamber P and is then discharged through the molten metal outlet 102 to the outside. The discharge pressure and the discharge amount as the pumping power of the molten metal pump 100 illustrated in FIG. 1 depend on the capacity of the pump chamber P as described above.

The discharge amount of the molten metal M through the molten metal outlet 102 per unit time can be adjusted by changing the rotation speed of the rotary magnet 27 using the electric motor 25a. In order to perform such control, for example, an inverter-controllable electric motor can be used as the electric motor 25a. This makes it possible to arbitrarily control the discharge amount per unit time. That is, it can be said that a device according to an embodiment of the present invention has a tertiary pumping power adjustment function (tertiary adjustment function) by the electric motor 25*a*.

Moreover, in order to enhance the pumping power while using the same magnetic field generator 5, the upper wall of the pump chamber P (inner cylinder bottom wall 9*a*) may be thinned. In a case where the bottom wall 9*a* is thinned, damage to the bottom wall 9*a* is accelerated. However, if the bottom wall 9*a* is damaged, the inner cylinder 9 may be replaced. A device according to an embodiment of the present invention can also be used in this way.

Figure 6:
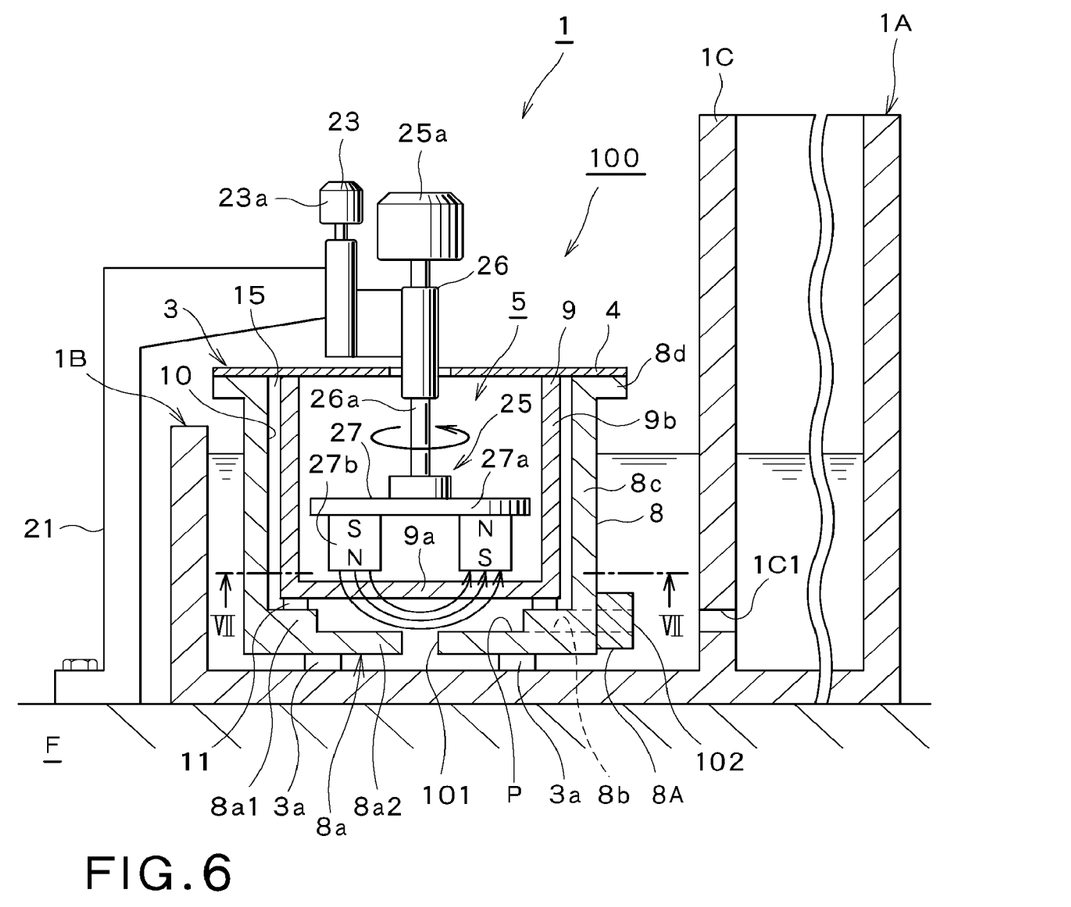
FIG. 6 is a vertical cross-sectional explanatory view of a melting furnace having a molten metal pump, illustrating another specific example of the melting furnace of FIG. 1.
Figure 7:
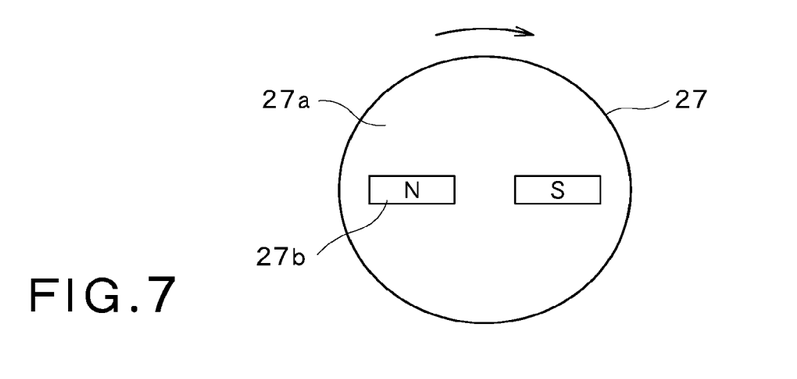
FIG. 7 is an explanatory view of a rotary magnet of FIG. 6 viewed along line VII-VII.

FIGS. 6 and 7 illustrate different examples of the rotary magnet 27. That is, as can be seen particularly from FIG. 7, only one pair of permanent magnets 27*b* are used. The mode of lines of magnetic force ML at this time is illustrated in FIG. 6.

Figure 8:
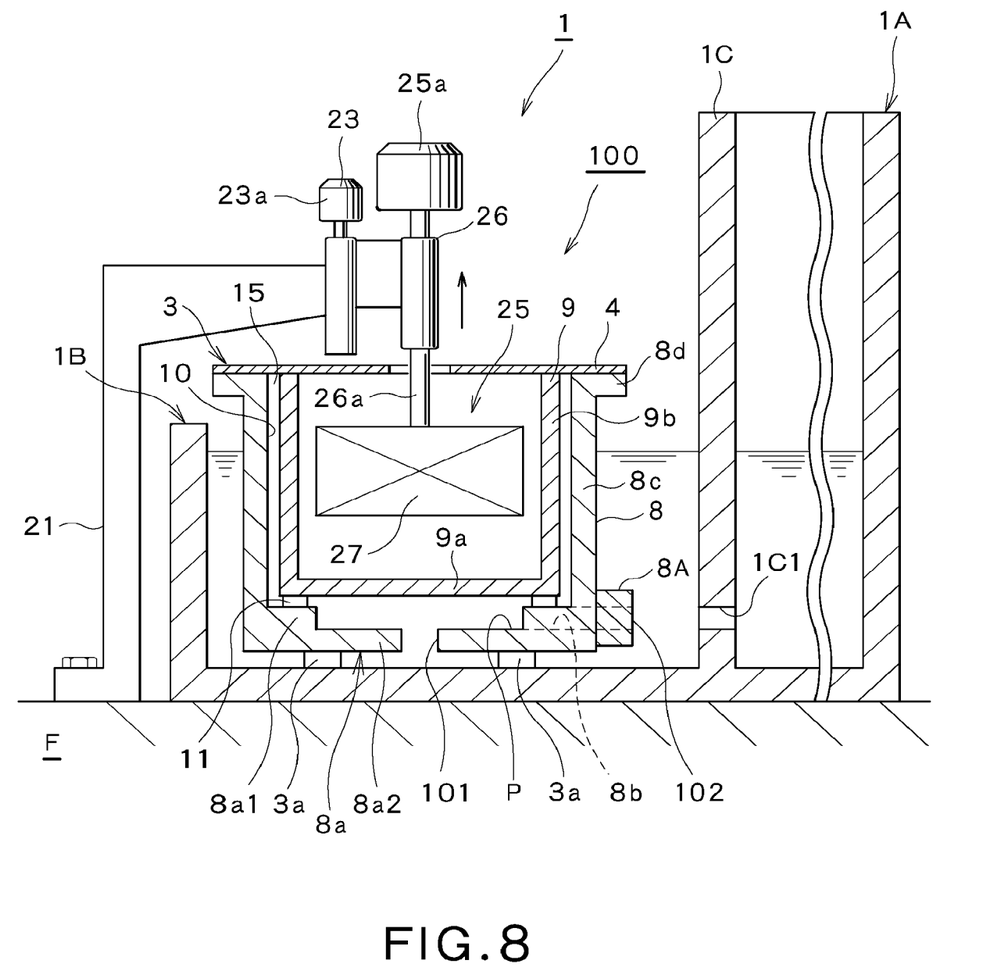
FIG. 8 is a vertical cross-sectional explanatory view illustrating an operation example in a state in which a magnetic field generator body in the melting furnace of FIG. 1 is moved upward.

In a device according to an embodiment of the present invention, it is to be noted that the magnetic field generator 5 is configured to be vertically movable with respect to the container 3 (inner cylinder 9 and outer cylinder 8) as described above. For example, FIG. 8 illustrates a state in which the magnetic field generator body 25 is moved to a position higher than the position illustrated in FIG. 1 by the elevating mechanism 23. For example, FIG. 4 illustrates one mode in which lines of magnetic force ML penetrate the molten metal M in the pump chamber P. Thus, this mode is changed by moving the magnetic field generator body 25 upward (or downward). By changing the mode in which lines of magnetic force ML penetrate the molten metal M in the pump chamber P in this way, the pumping power can be adjusted (increased or decreased) (secondary adjustment function). If the amount of vertical movement of the magnetic field generator 5 is decreased, the pumping power can be finely adjusted. That is, the pumping power of the molten metal pump 100 can be set to any value between the maximum value and the minimum value, and the molten metal pump 100 can be operated with a desired pumping power. Moreover, it is clear that the height of the magnetic field generator body 25 can be set to a value that provides the maximum pumping power. That is, it is possible to tune the pumping power (secondary adjustment function). That is, it can be said that the molten metal pump 100 has a secondary pumping power adjustment function (secondary adjustment function). As a result, the pumping power can be adjusted more drastically in cooperation with the primary adjustment function.

Figure 9:
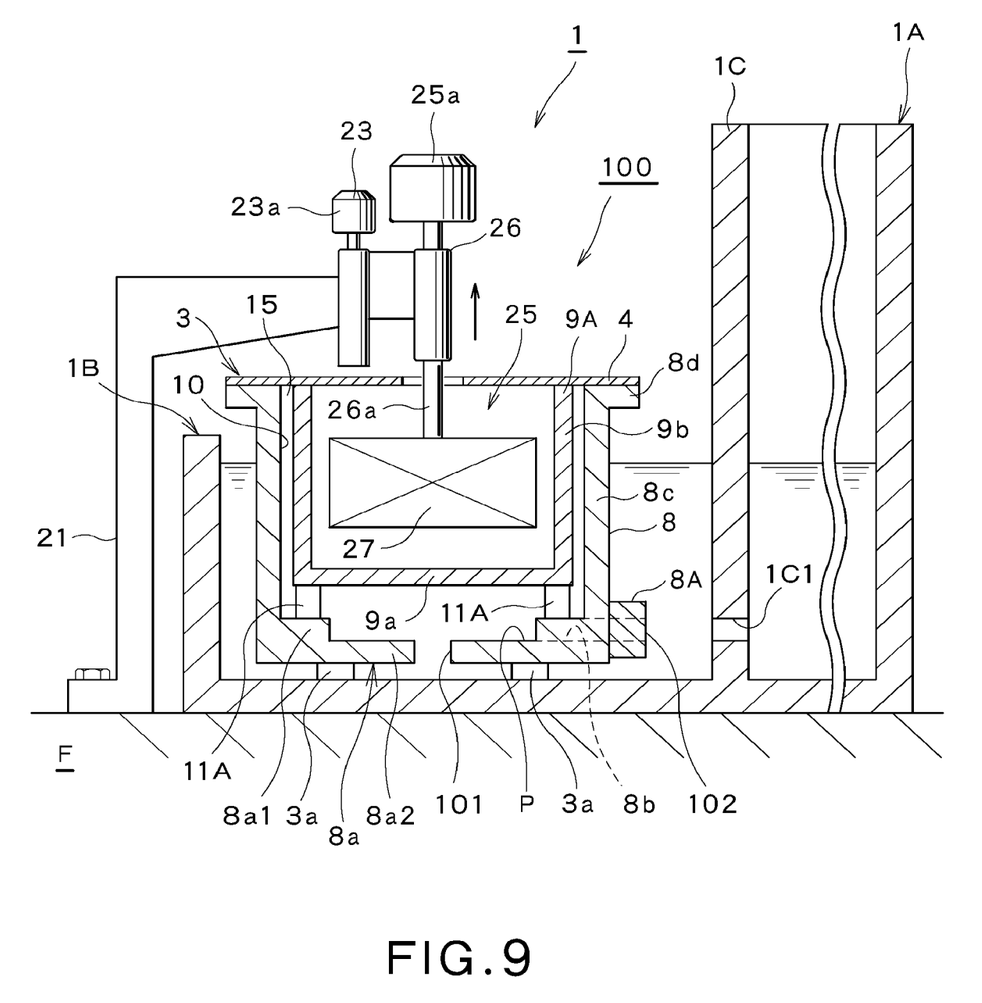
FIG. 9 is a vertical cross-sectional explanatory view illustrating an operation example in a state in which an inner cylinder having a low height is used in the melting furnace of FIG. 8 and the inner cylinder is lifted to increase the capacity of a pump chamber.

FIG. 9 illustrates an example of the primary pumping power adjustment function (primary adjustment function). In other words, FIG. 9 illustrates a state in which the spacer 11 in FIG. 8 is replaced with another spacer 11A having a different height so as to change (increase) the capacity of the pump chamber P. It is to be noted that the inner cylinder 9 is also replaced with an inner cylinder 9A having a height corresponding to the spacer 11A used for replacement. As a result, the pumping power (discharge pressure and discharge amount) can be adjusted to a desired value as described above. That is, FIG. 9 illustrates a state in which the inner cylinder 9A is lifted higher than in FIG. 8 so as to increase the capacity of the pump chamber P. This makes it possible to increase the discharge amount while suppressing the discharge pressure of the pump. On the contrary, if the pump chamber P is made smaller by using a spacer lower than in FIG. 9, it is clear that the discharge pressure can be increased and the discharge amount can be suppressed.

As can be seen from the above description, the molten metal pump 100 has two pumping power adjustment functions, i.e., a primary pumping power adjustment function and a secondary pumping power adjustment function.

Therefore, in the molten metal pump 100, the pumping power (discharge pressure and discharge amount) first can be adjusted and set primarily by setting the capacity of the pump chamber P, and then the pumping power determined primarily can be adjusted secondarily by adjusting the height of the magnetic field generator body 25. Furthermore, as briefly described above, it can be said that a tertiary pumping power adjustment function (tertiary adjustment function) using the electric motor 25*a* is also provided.

Next, an example of installation and assembly of the molten metal pump 100 configured as described above in the stirring bath 1B will be described.

First, the case of new installation will be described.

As can be seen from FIG. 1, the outer cylinder 8 is installed in the stirring bath 1B via the legs 3*a*. Next, the inner cylinder 9 is inserted into the outer cylinder 8 via the spacer 11 having a desired height. This inner cylinder 9 is a bottomed cylinder having a large section modulus and high strength. Then, a desired heat insulator 15 is inserted into the gap 10 sealed with the pump chamber P by the spacer 11 between the outer cylinder 8 and the inner cylinder 9. It is to be noted that the inner cylinder 9 is then fixed by the lid 4 in a state reliably pressed against the outer cylinder 8 from above to below.

Then, the magnetic field generator body 25 of the magnetic field generator 5 is housed in the inner cylinder 9 so as to have a desired height. The height is adjusted by the elevating mechanism 23. The pumping power (discharge pressure and discharge amount) of the molten metal pump 100 installed in this way is determined by the capacity of the pump chamber P (primary adjustment function) according to the height of the spacer 11, and the height of the magnetic field generator body 25 in the inner cylinder 9 (secondary adjustment function).

After installation, the pumping power can be adjusted by the primary adjustment function by replacing the spacer 11 with another spacer having a different height so as to increase or decrease the capacity of the pump chamber P, and the pumping power can be adjusted by the secondary adjustment function by adjusting the height of the magnetic field generator body 25 in the inner cylinder 9. That is, as described above, it is possible with a device according to an embodiment of the present invention to adjust the pumping power in two steps.

As can be seen from the above description, it is to be noted that the capacity of the pump chamber P can be changed by detaching the magnetic field generator body 25 in FIG. 1 from the inner cylinder 9. In this state, the inner cylinder 9 is detached from the outer cylinder 8 (FIG. 2), and the spacer 11 is replaced with another spacer 11A having a desired height (FIG. 9). Then, the inner cylinder 9A is inserted into the outer cylinder 8 via the heat insulator 15. Then, the magnetic field generator body 25 is housed in the inner cylinder 9A, and the height of the magnetic field generator body 25 is adjusted as necessary.

As described above, when the inner cylinder 9 is detached in FIG. 2, the upper wall of the pump chamber P is removed and the inside is exposed. As a result, the molten slag adhering to each place inside the pump chamber P (e.g., molten metal inlet 101, pump chamber P, outflow guide hole 8*b*, or molten metal outlet 102), particularly the slag of impurities present in the molten metal M or the like, can be easily removed as described above.

The molten metal pump 100 according to the present embodiment can be used in various ways other than the above.

Figure 10:
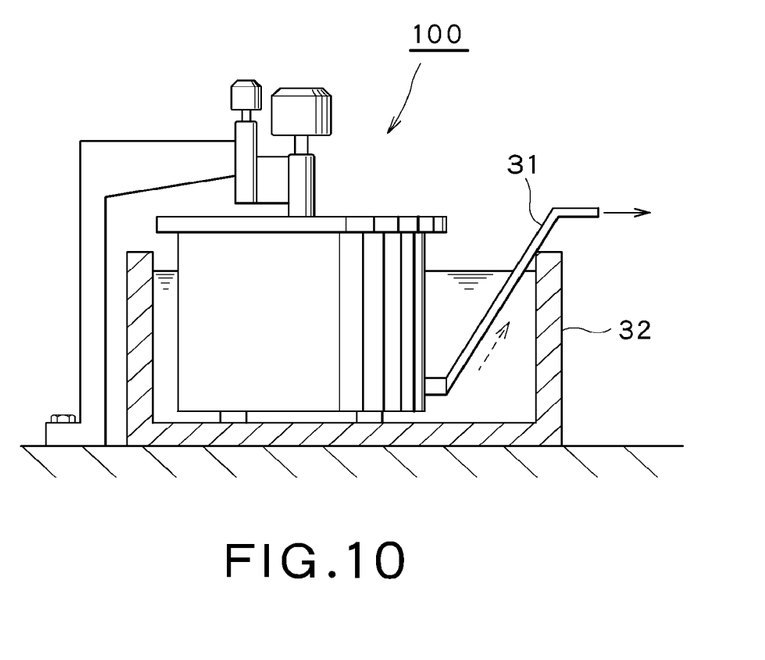
FIG. 10 is a vertical cross-sectional explanatory view illustrating an example of a melting furnace in which the pump device illustrated in FIG. 1 is connected with a molten metal discharge pipe.

For example, FIG. 10 illustrates a configuration example of a melting furnace in which the molten metal M is discharged from a bath 32 by the molten metal pump 100. That is, the nozzle 8A (molten metal outlet 102) is connected with a molten metal discharge pipe (connection pipe) 31.

Figure 11:
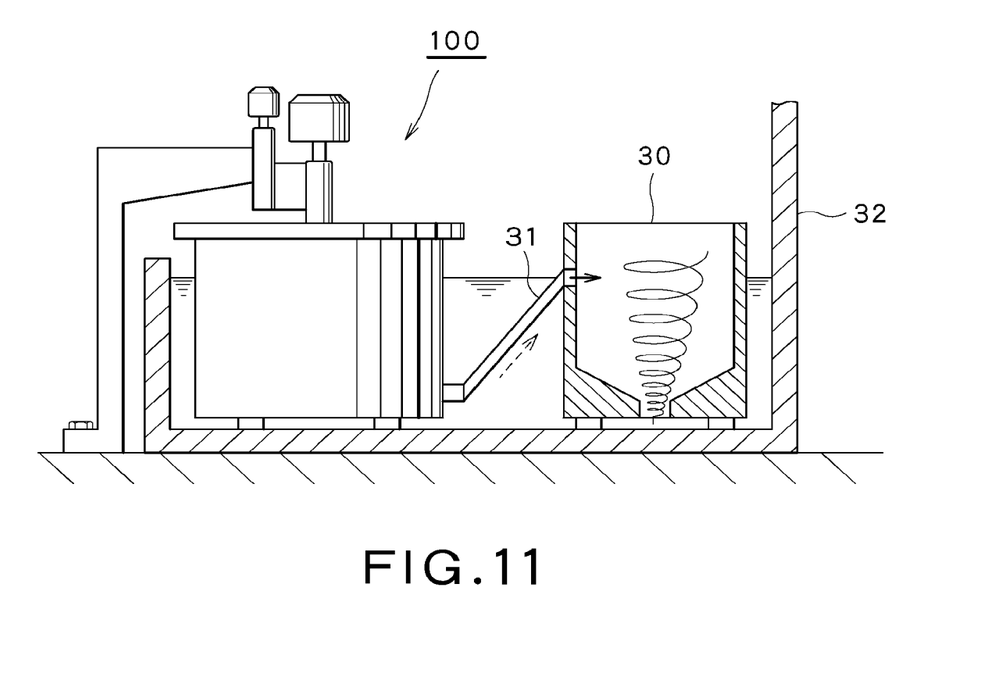
FIG. 11 is a vertical cross-sectional explanatory view illustrating an example of a melting furnace in which the pump device illustrated in FIG. 1 is connected with a chip melting furnace.

Moreover, FIG. 11 illustrates a configuration example of a melting furnace in which the molten metal M in the bath 32 is returned to a chip melting furnace 30. That is, the nozzle 8A (molten metal outlet 102) is connected with the chip melting furnace 30 by the molten metal discharge pipe 31. In this example, rapid melting is performed by charging chips, ingots, or the like into the chip melting furnace 30. In this example, it is to be noted that the molten metal pump 100 and the chip melting furnace 30 may be integrally configured instead of being connected by the molten metal discharge pipe 31.

In FIGS. 10 and 11, the molten metal pump 100 can be installed at any position in the bath 32 and in any discharge direction. This can be said to have extremely high flexibility in installing the molten metal pump 100 in the existing bath 32. As a result, the usefulness of the molten metal pump 100 can be made extremely high.

Moreover, even when the molten metal pump 100 is installed in the bath 32 having the chip melting furnace 30 in FIG. 11, the molten metal pump 100 can be installed in any position in the bath 32 to have any discharge direction, and the usability of the molten metal pump 100 is extremely good. In installing the molten metal pump 100, there is no need to make a major modification or the like to the furnace. With respect to FIG. 11, if the connection pipe 31 is disconnected, the molten metal pump 100 can also function as a molten metal circulation device in the bath 32.

REFERENCE SIGNS LIST

1 Melting furnace
1A Main bath
1B Stirring bath
1C Partition wall
1C1 Communication opening
3 Container
3*a* Leg
4 Lid
5 Magnetic field generator
8 Outer cylinder
8*a* Bottom wall
8A Nozzle
8*a*1 Inner cylinder support portion
8*a*2 Pump chamber section
8*b* Outflow guide hole
8*c* Side wall
8*d* Flange
9 Inner cylinder
9*a* Bottom wall
9A Inner cylinder
9*b* Side wall
9*c* Hanging hole
10 Gap
11 Spacer
11A Spacer
14 Rotary magnet
15 Heat insulator
21 Arm
23 Elevating mechanism
23*a* Electric motor
25 Magnetic field generator body
25*a* Electric motor
26 Shaft mechanism
26*a* Shaft
27 Rotary magnet
27*a* Disk
27*b* Permanent magnet
30 Chip melting furnace
31 Molten metal discharge pipe
32 Bath
32A Permanent magnet
32B Permanent magnet
100 Molten metal pump
101 Molten metal inlet
102 Molten metal outlet
F Floor
M Molten metal
ML Line of magnetic force
P Pump chamber

The invention claimed is:

1. A molten metal pump, which comprises a pump chamber portion and a drive unit and drives molten metal in a pump chamber of the pump chamber portion by the drive unit so as to discharge the molten metal through a pump chamber outlet of the pump chamber portion and suck external molten metal through a pump chamber inlet of the pump chamber portion into the pump chamber, wherein the pump chamber portion has an outer cylinder and an inner cylinder detachably housed in the outer cylinder, the outer cylinder being configured as a bottomed cylindrical body having an outer cylinder bottom wall and an outer cylinder side wall, the inner cylinder being configured as a bottomed cylindrical body having an inner cylinder bottom wall and an inner cylinder side wall, a ring-shaped spacer, which is interposed between an inner surface of the outer cylinder bottom wall and an outer surface of the inner cylinder bottom wall in a sealed state and in a detachable manner, is further provided, the spacer partitioning a space between an inner surface of the outer cylinder bottom wall and an outer surface of the inner cylinder bottom wall to form the pump chamber, the pump chamber communicating with outside through the pump chamber inlet formed at the outer cylinder bottom wall and the pump chamber outlet formed at the outer cylinder side wall, the drive unit has a rotary magnet provided inside the inner cylinder so as to be rotatable about a vertical rotation axis, the rotary magnet having a plurality of permanent magnets arranged on a circumference around the rotation axis, the plurality of permanent magnets each having an upper surface magnetic pole and a lower surface magnetic pole magnetized so that an upper surface part and a lower surface part become magnetic poles, the plurality of permanent magnets are arranged so that upper surface magnetic poles and lower surface magnetic poles having different magnetic poles are alternately aligned along the circumference, the plurality of lower surface magnetic poles of the plurality of permanent magnets vertically facing the inner cylinder bottom wall, and strengths of the plurality of permanent magnets are set so that a line of magnetic force from a first permanent magnet penetrates the inner cylinder bottom wall downward to reach the pump chamber, and penetrates the inner cylinder bottom wall upward from the pump chamber to return to a second permanent magnet adjacent to the first permanent magnet.

2. The molten metal pump according to claim 1, wherein the drive unit further includes an elevating mechanism that can vertically move the rotary magnet inside the inner cylinder.

3. The molten metal pump according to claim 1, wherein the pump chamber inlet is formed near a center of the outer cylinder bottom wall.

4. The molten metal pump according to claim 1, wherein a gap is formed between the outer cylinder side wall and the inner cylinder side wall.

5. The molten metal pump according to claim 4, wherein the gap is a space without a heat insulator interposed in the gap.

6. The molten metal pump according to claim 1, wherein a gap is provided between a peripheral wall of the outer cylinder and a peripheral wall of the inner cylinder, and wherein a sandy heat insulator or a powdery heat insulator is housed in the gap.

7. The molten metal pump according to claim 1, further comprising an electric motor that drives the rotary magnet to rotate.

8. The molten metal pump according to claim 7, wherein the electric motor is configured such that the rotary magnet has a variable rotational frequency.

9. The molten metal pump according to claim 1, wherein the rotary magnet is housed in a state hung from above inside the inner cylinder.

10. The molten metal pump according to claim 2, wherein the elevating mechanism is attached to a tip of an arm having a lower end fixed to a floor.

11. The molten metal pump according to claim 2, wherein the elevating mechanism is attached to a tip of an arm having a lower end fixed to a mobile body capable of traveling on a floor.

12. The molten metal pump according to claim 1, wherein a hanging hole for gripping and conveying the inner cylinder is formed at the inner cylinder side wall of the inner cylinder.

13. A method of adjusting a pumping power of a molten metal pump, which comprises a pump chamber portion and a drive unit and drives molten metal in a pump chamber of the pump chamber portion by the drive unit so as to discharge the molten metal through a pump chamber outlet of the pump chamber portion and suck external molten metal through a pump chamber inlet of the pump chamber portion into the pump chamber, wherein the pump chamber portion has an outer cylinder and an inner cylinder detachably housed in the outer cylinder, the outer cylinder being configured as a bottomed cylindrical body having an outer cylinder bottom wall and an outer cylinder side wall, the inner cylinder being configured as a bottomed cylindrical body having an inner cylinder bottom wall and an inner cylinder side wall, a ring-shaped spacer, which is interposed between an inner surface of the outer cylinder bottom wall and an outer surface of the inner cylinder bottom wall in a sealed state and in a detachable manner, is further provided, the spacer partitioning a space between an inner surface of the outer cylinder bottom wall and an outer surface of the inner cylinder bottom wall to form the pump chamber, the pump chamber communicating with outside through the pump chamber inlet formed at the outer cylinder bottom wall and the pump chamber outlet formed at the outer cylinder side wall, the drive unit has a rotary magnet provided inside the inner cylinder so as to be rotatable about a vertical rotation axis, the rotary magnet having a plurality of permanent magnets arranged on a circumference around the rotation axis, the plurality of permanent magnets each having an upper surface magnetic pole and a lower surface magnetic pole magnetized so that an upper surface part and a lower surface part become magnetic poles, the plurality of permanent magnets are arranged so that upper surface magnetic poles and lower surface magnetic poles having different magnetic poles are alternately aligned along the circumference, the plurality of lower surface magnetic poles of the plurality of permanent magnets vertically facing the inner cylinder bottom wall, and strengths of the plurality of permanent magnets are set so that a line of magnetic force from a first permanent magnet penetrates the inner cylinder bottom wall downward to reach the pump chamber, and penetrates the inner cylinder bottom wall upward from the pump chamber to return to a second permanent magnet adjacent to the first permanent magnet, the method including a step of replacing the spacer with another spacer having a different height so as to change an interval between the outer cylinder bottom wall and the inner cylinder bottom wall and change a capacity of the pump chamber, thereby adjusting the pumping power.

* * * * *